Aug. 10, 1948.                R. M. GLANTZER                    2,446,648
                    ELECTRICAL RESISTANCE WELDER WITH
                          INDEXING FINGER CONTROL
Filed Feb. 21, 1947                                        3 Sheets-Sheet 1
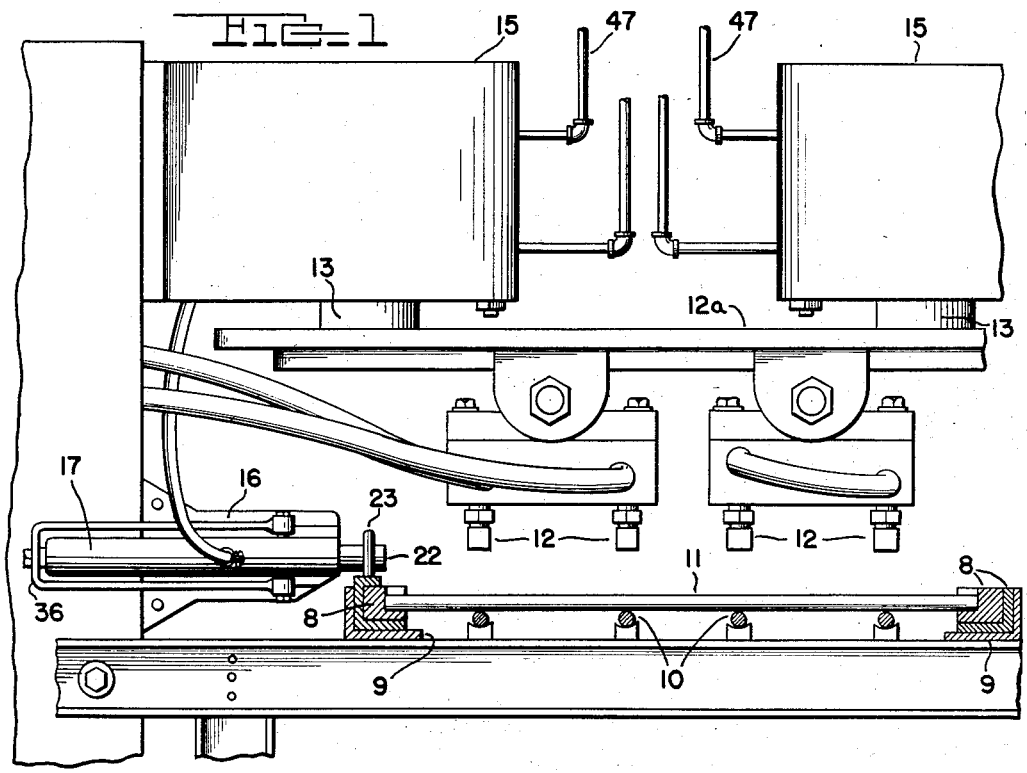
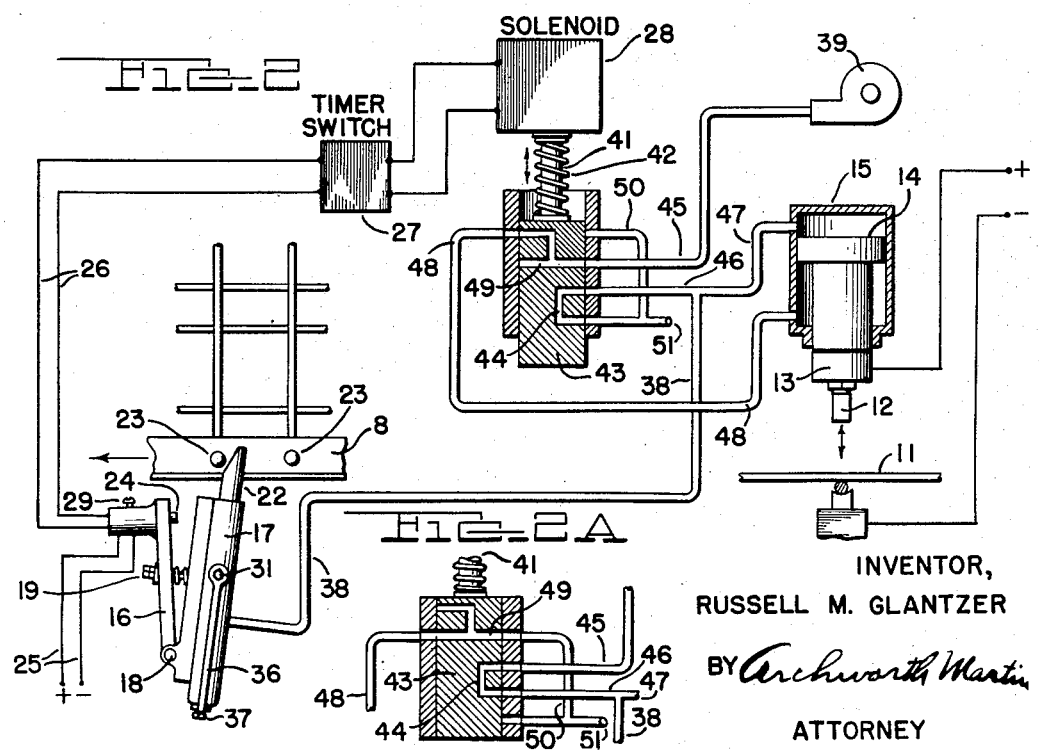
INVENTOR,
RUSSELL M. GLANTZER
BY Archworth Martin
ATTORNEY

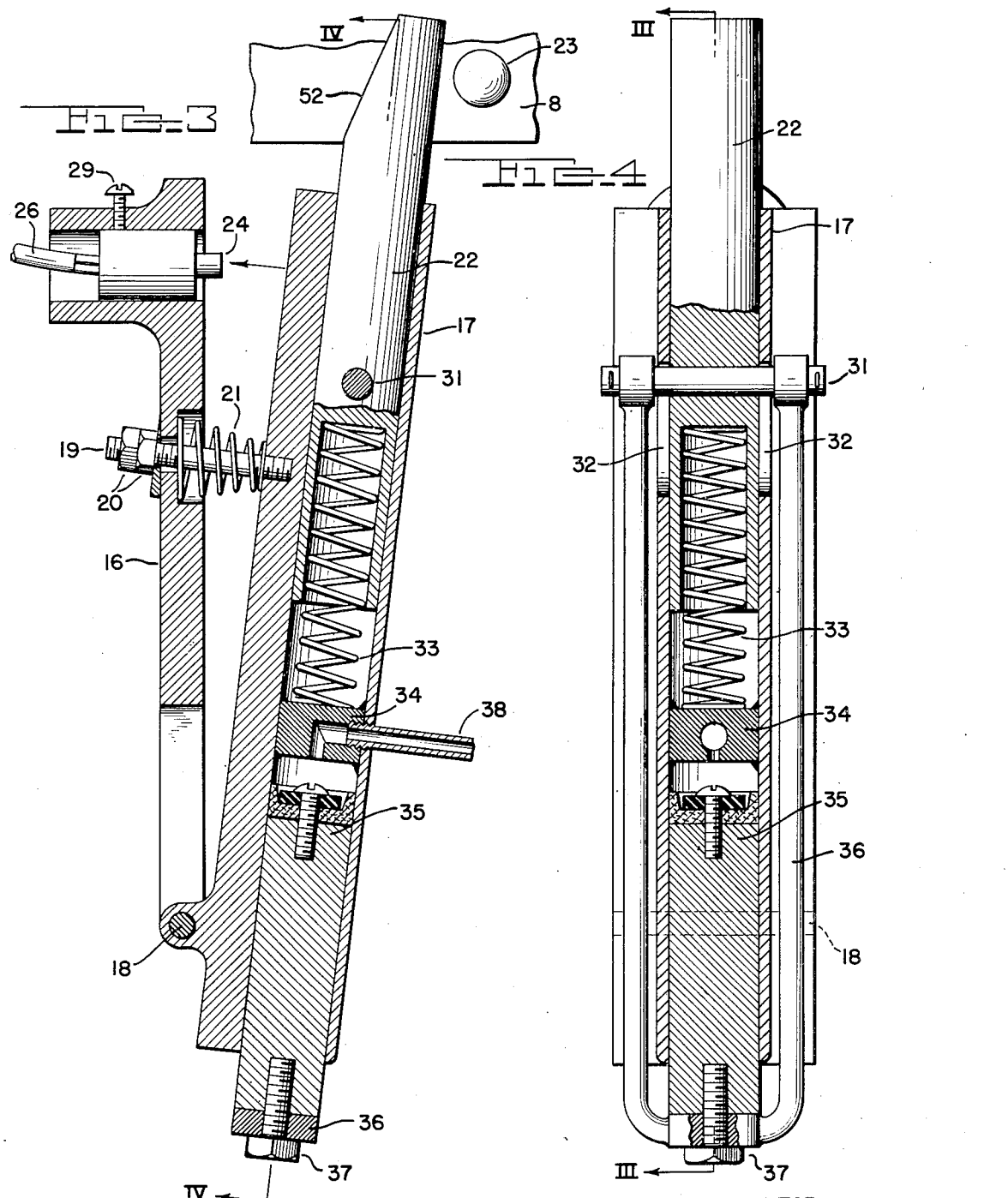

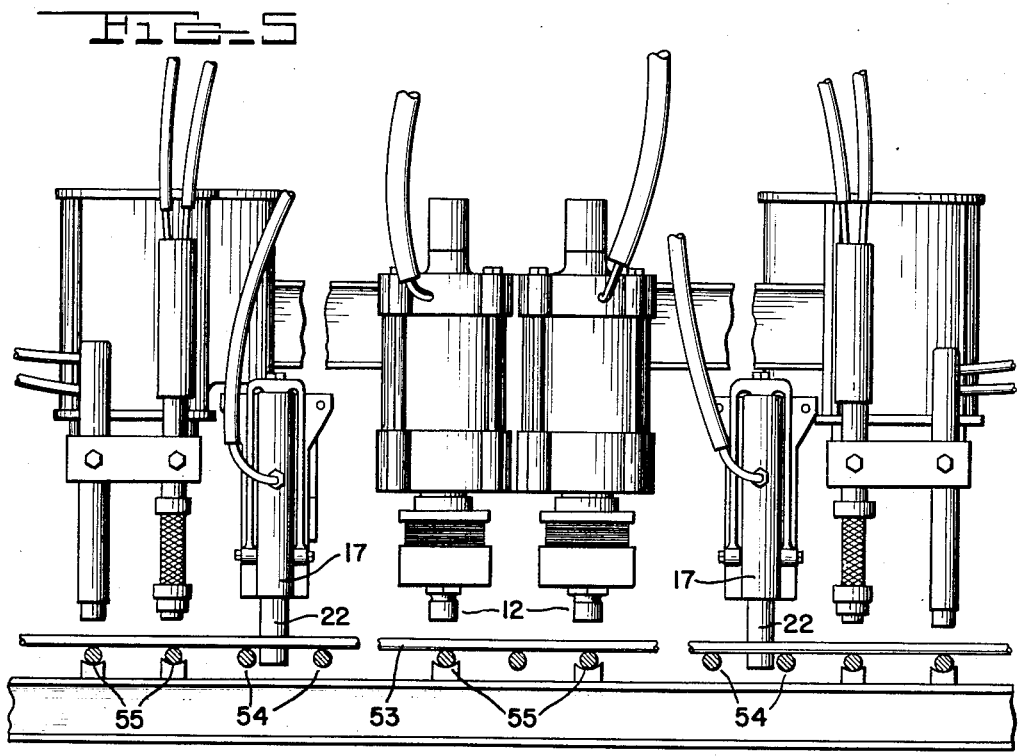

Patented Aug. 10, 1948

2,446,648

UNITED STATES PATENT OFFICE 2,446,648

ELECTRICAL RESISTANCE WELDER WITH INDEXING FINGER CONTROL

Russell Millard Glantzer, Washington, Pa.

Application February 21, 1947, Serial No. 729,993

7 Claims. (Cl. 219—4)

My invention relates to an indexing and welding control device that is particularly suitable for use with the spot-welding machines wherein the work pieces are intermittently moved through a welding machine, past reciprocating electrodes that serve to weld the work pieces together.

One object of my invention is to provide a device of the character referred to that will automatically control the operation of the electrodes and the flow of welding current and which will insure that the points at which the work pieces are to be welded together will be accurately centered or positioned at the electrodes.

Another object of my invention is to provide an indexing and welding device that is automatically operable through intermittent movements of work pieces through the welding machine, either manually or by a mechanically-operated device.

Some of the forms which my invention may take are shown in the accompanying drawings wherein Figure 1 is an elevational view of a welding machine, partly in section; Fig. 2 is a schematic view showing the manner in which the welding electrodes of the machines are moved to and from welding position and showing the control valve in position for moving the electrodes away from the work; Fig. 2A is a view showing the position of the control valve when the electrodes are to be moved to welding position; Fig. 3 is a sectional view on an enlarged scale, through the control finger of Figs. 1 and 2, taken on the line III—III of Fig. 4; Fig. 4 is a view taken on the line IV—IV of Fig. 3, and Fig. 5 shows a modification of the structure of Fig. 1 with the indexing finger positioned to be automatically operated by the work piece itself, instead of by a jig that carries the work.

Referring first to Figs. 1 to 4, I show a welding machine of a well-known form wherein a jig 8 for carrying the work is slidably mounted on stationary track rails or guide bars 9, the jig being moved step-by-step longitudinally along the rails either manually or by intermittently operable conveyor mechanism (not shown). In the present instance, the pieces to be welded together are in the form of longitudinally-extending rods or wires 10 and transversely-extending rods 11 whose ends are supported in the jig 8. The rods 11 are welded to the rods 10 by reciprocably-mounted electrodes 12, the welding circuit through the work pieces being automatically completed through engagement of the electrodes with the bars 11, as is well known in the fabric welding art. The electrodes are carried by a cross head 12a that is connected to the piston rods 13 having pistons 14 that are raised and lowered through the admission of fluid pressure to the upper and lower ends of their cylinders 15, the operation of the piston being controlled by the control valve of Fig. 2. The raising and lowering of the electrodes to make the welds is automatically effected in timed relation to movement of the work pieces by the indexing and control finger hereinafter described.

The indexing and control device comprises a bracket 16 that is bolted to a stationary part of the machine. A plunger casing 17 having a cylindrical bore is pivotally connected at 18 to the bracket and carries a screw stud 19 provided with nuts 20, that limits swinging movement of the casing 17 in a direction away from the bracket. A spring 21 urges the plunger casing away from the bracket.

A finger 22 is slidable in the casing, into and out of the path of studs 23 that are carried by the jig 8, so that as the work is moved through the machine, the casing 17 will be moved against a push-button switch 24 to close a control circuit through electrical conductors 25—26, a timer switch 27 and a solenoid 28. The switch is removably held in the bracket by a screw 29 so that it can readily be removed for repairs.

A pin 31 extends through the finger 22 and through elongated slots 32 in the casing 17, so that the finger can have guided vertical movement in the casing. A spring 33 seating against a fixed block 34 in the casing serves to yieldably hold the finger in outwardly-projected position.

A piston 35 is positioned below the block 34 and protrudes from the lower end of the casing. A yoke 36 is connected with the piston by a screw 37, and the pin 31 extends through the ends of the yoke, so that when the piston is moved downward, the finger 22 will also be pulled down, against the resistance of the spring 33. Fluid pressure for moving the piston downwardly is admitted through a pipe 38 and a port in the block 34. When there is no fluid pressure against the upper face of the piston, the spring 33 will return the finger and the piston to the position shown in Fig. 3. Fluid pressure for operating the finger 22 and the electrodes is supplied from a suitable source such as that indicated by the pump 39.

The work pieces are positioned upon the jig 8 in definite relation to the studs 23. When the jig 8 is advanced from the position shown in Fig. 2, to a point at which the right-hand stud 23 has moved the casing 17 against the push-button 24, the electric control circuit will be completed, thus energizing the solenoid 28 and moving its core 41 upwardly against the pressure of a spring 42. The core 41 is connected to a valve 43 which is also raised, so that its port 44 will be brought into registry with ports in the valve casing that communicate with a pipe 45 that leads from the pump 39 and a pipe 46 whose one branch 38 leads into the cylinder above the piston 35 and whose other branch or branches 47 lead into the upper ends of the cylinders 15 to move the electrodes 12 downwardly against the work, by reason of which movement the welding circuit will automatically be completed as is usual in welding machines of this type.

At this time, air is being exhausted from below the piston 14 through a pipe 48, through a valve port 49 and a pipe 50 to the atmosphere at 51. The welding rods and the valve 43 remain in these positions until the circuit through the solenoid is broken. This period will be for only a fraction of a second for light work, the duration being controlled by the timer switch 27 which is adjusted in well known ways to automatically interrupt the circuit.

Upon interruption of the control circuit by the timer switch, the solenoid becomes deenergized, thus allowing the spring 42 to return the valve 43 to the position shown in Fig. 2. Thereupon, the air pressure is admitted to the underside of the piston 14, through the pipe 45, the port 49 and the pipe 48, to raise the electrodes, the air being exhausted from the upper side of the piston 14 through the pipe 47 and port 44. Also, air is exhausted from the upper side of the piston 35, through the pipe 38 and the port 44. The finger 22 is thereupon projected into the path of the next succeeding stud 23 to again close the control circuit through the timer switch and solenoid, upon further movement of the jig, and thereby repeat the operations just described. It will be understood that air is not admitted to the upper side of the piston 35 until the finger 22 has been moved to a point at which the casing 17 closes the switch 24, and that there is almost simultaneous movements of the electrodes to welding position and immediate withdrawal of the finger 22 out of the path of the next stud 23. While the finger is in its temporarily retracted position, the casing 17 will swing back to the position shown in Figs. 2 and 3, the air pressure above the piston 35 being immediately released to permit projection of the finger by its spring 33. The jig 8 will then again be moved forwardly so that the finger will be engaged by the next stud 23.

Should it be found that a weld was imperfectly made, the work can be pushed backwardly in the machine, the forward sides of the fingers 22 being beveled at 52 to permit such backward movement of the work. This movement will be followed by another forward movement in the regular way to effect another welding operation.

Referring now to Fig. 5, I show a somewhat different arrangement wherein the work pieces themselves operate the finger control, the fingers 22 being projectible into the path of the cross pieces 53 which may have previously been welded to longitudinal rods 54, it being desired to weld additional or other rods 55 to the cross bars. Except for this different manner of mounting and operating the indexing fingers, the operation of the apparatus is the same as in Figs. 1 to 4.

I claim as my invention:

1. An indexing and control device for electric welding machines, comprising a member mounted for movement back and forth in a fixed path, a finger on said member and movable relative thereto, means normally urging said member to its retracted position, means normally moving the finger to a projected position for engagement by an element that moves synchronously with a work piece which is to be subjected to welding operation, whereby the said member is moved to its forward position, a control device for a welding electrode, energized through forward movement of the said member, and means operating in timed relation to movement of the work piece, for automatically withdrawing the finger from said element and temporarily holding it withdrawn, until the said member has moved to its retracted position, and for thereupon releasing the finger for movement to its projected position.

2. An indexing and control device for electric welding machines, comprising a switch for controlling welding operations, and means operable by elements movable synchronously with a work piece, for periodically closing and opening the switch, the said means comprising a finger and means operating in timed relation to the switch, for moving the finger into and out of the path of said elements and reciprocating it in a direction generally parallel to said path.

3. The combination with a device for supporting and moving work pieces past welding electrodes, and a fluid-pressure device for moving electrodes into and out of engagement with the work pieces, of an indexing finger engageable by an element, for movement with the work pieces, means for moving the finger into and out of cooperative relation with said elements, and means actuated through movements of the finger by said elements, for controlling said fluid-pressure device.

4. The combination with a device for supporting and moving work pieces past welding electrodes, and a fluid-pressure cylinder for moving electrodes into and out of engagement with the work pieces, of an indexing finger, a pivotally-mounted supporting member for said finger, a spring yieldably holding said finger in the path of elements that move synchronously with the work pieces, a piston for withdrawing said finger from said path, an electric switch operated upon movement of said member in one direction, by engagement of the elements with said finger, a spring yieldably urging said member in the opposite direction, a solenoid having its circuit controlled by said switch, a valve operated by the solenoid, and fluid-pressure connections through said valve to the said cylinder and the said piston, the ports in said valve being so arranged that when pressure is admitted to the cylinder to move the electrode into engagement with the work, fluid pressure is supplied to one side of said piston to effect withdrawal of the finger from said path, and a timer device for limiting the duration of the applications of said fluid pressures.

5. The combination with a device for supporting and moving work pieces past welding electrodes, and a fluid-pressure cylinder for moving electrodes into and out of engagement with the work pieces, of an indexing finger, a pivotally-mounted supporting member for said finger, a spring yieldably holding said finger in the path of elements that move synchronously with the work pieces, a piston for withdrawing said finger from said path, an electric switch operated upon movement of said member in one direction, by engagement of the elements with said finger, a spring yieldably urging said member in the opposite direction, a solenoid having its circuit controlled by said switch, a valve operated by the solenoid, and fluid-pressure connections through said valve to the said cylinder and the said piston, the ports in said valve being so arranged that when pressure is admitted to the cylinder to move the electrode into engagement with the work, fluid pressure is supplied to one side of said piston to effect withdrawal of the finger from said path, and a timer device for limiting the duration of the applications of said fluid pressures, the said valve being provided with means for restoring it to its original position after operation by the solenoid and with ports for the relief of said fluid pressures when at said position.

6. An indexing and control device for electric welding machines, comprising a switch for controlling welding operations, and means operable by elements movable synchronously with a work piece, for periodically closing and opening the switch, the said means comprising a finger with means operating in timed relation to the switch, for moving the finger into and out of the path of said elements and reciprocating it in a direction generally parallel to said path, and a timing device for limiting the duration of a welding operation and for effective synchronism as between the operation of said finger and the welding operation.

7. An indexing and control device for electric welding machines, comprising a member mounted for a fixed range of movement relative to the travel of work through a welding machine, the said member being projectible into and out of the path of elements that move synchronously with a work piece, whereby the member is moved in the path of said range, means actuated upon said movement of the member in one direction to move a welding electrode to circuit-closing position on the work piece, and means operating in timed relation to movement of the work piece, for moving said member into position for engagement by another element, preliminary to a second welding operation.

RUSSELL MILLARD GLANTZER.

REFERENCES CITED

The following references are of record in the file of this patent:

UNITED STATES PATENTS

| Number | Name | Date |
|---|---|---|
| 2,159,860 | Platz | May 23, 1939 |
| 2,211,186 | Weston | Aug. 13, 1940 |